(12) United States Patent
Takinoiri

(10) Patent No.: US 10,969,562 B2
(45) Date of Patent: Apr. 6, 2021

(54) OBSERVATION DEVICE AND FOCUS ADJUSTMENT METHOD

(71) Applicant: Olympus Corporation, Hachioji (JP)

(72) Inventor: Satoshi Takinoiri, Yokohama (JP)

(73) Assignee: Olympus Corporation, Tokyo (JP)

(*) Notice: Subject to any disclaimer, the term of this patent is extended or adjusted under 35 U.S.C. 154(b) by 292 days.

(21) Appl. No.: 16/154,676

(22) Filed: Oct. 8, 2018

(65) Prior Publication Data

US 2019/0113710 A1   Apr. 18, 2019

(30) Foreign Application Priority Data

Oct. 18, 2017 (JP) .............................. JP2017-202016

(51) Int. Cl.
| | |
|---|---|
| *G02B 7/09* | (2021.01) |
| *G02B 21/00* | (2006.01) |
| *G02B 7/36* | (2021.01) |
| *G02B 21/24* | (2006.01) |
| *G02B 21/36* | (2006.01) |

(52) U.S. Cl.
CPC ............... *G02B 7/09* (2013.01); *G02B 7/365* (2013.01); *G02B 21/006* (2013.01); *G02B 21/244* (2013.01); *G02B 21/365* (2013.01)

(58) Field of Classification Search
CPC . G02B 7/09; G02B 7/04; G02B 7/365; G02B 7/36; G02B 21/006; G02B 21/244; G02B 21/241; G02B 21/365
See application file for complete search history.

(56) References Cited

U.S. PATENT DOCUMENTS

| | | | |
|---|---|---|---|
| 7,864,308 B2* | 1/2011 | Sato | G03F 9/7026 356/123 |
| 2017/0046846 A1* | 2/2017 | Watanabe | G06T 5/50 |
| 2019/0113710 A1* | 4/2019 | Takinoiri | G02B 7/365 |
| 2019/0179110 A1* | 6/2019 | Takinoiri | H04N 5/232121 |
| 2019/0268542 A1* | 8/2019 | Yamazaki | H04N 5/243 |

FOREIGN PATENT DOCUMENTS

| | | |
|---|---|---|
| JP | 10-232343 | 9/1998 |
| JP | 2008-020498 | 1/2008 |

\* cited by examiner

*Primary Examiner* — John R Lee
(74) *Attorney, Agent, or Firm* — John C. Pokotylo; Pokotylo Patent Services

(57) ABSTRACT

An observation device, comprising an image sensor that forms images of a specimen and outputs an image signal, an AF detection circuit that calculates evaluation values based on the image signal, and a focus control circuit that controls focus position based on the evaluation values, wherein the AF detection circuit calculates a plurality of evaluation values based on signals relating to a plurality of frequency bands of the image signal, and the focus control circuit controls focus position based on maximum value or minimum value of the plurality of evaluation values.

20 Claims, 7 Drawing Sheets

OBSERVATION DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2017-202016 filed on Oct. 18, 2017. This application is expressly incorporated herein by reference. The scope of the present invention is not limited to any requirements of the specific embodiments described in the application.

BACKGROUND OF THE INVENTION

1. Field of the Invention

The present invention relates to an observation device and focus adjustment method that perform imaging of a specimen such as cells using an imaging section, and perform focus adjustment of a focus lens on the basis of image data that has been acquired.

2. Description of the Related Art

Conventionally, in an observation device, such as a microscope, a device that performs an auto focus operation by determining contrast by means of image processing of an observation image that has been formed by an image sensor, a so-called contrast AF method auto focus device, is known. This contrast AF is a method of calculating a contrast value (focus evaluation value) for a subject image that has been formed by a photographing lens, and controlling focus position of the photographing lens such that this focus evaluation value becomes a peak (refer to Japanese patent laid-open No. Hei. 10-232343 (hereafter referred to as patent publication 1)).

Also, in recent years, in the fields of biochemistry and medicine there has been cultivation and breeding of cells that have been collected from within the body, and there has been advancement in research applied to the examination of such cells that have been cultivated, and advancement in the automation of observation and measurement of cultivated cell states. Automation of focus adjustment on cells is therefore also being examined. However, for transparent objects such as non-colored cells, with contrast AF a focus evaluation value at in focus position does not become a peak value, but becomes a minimum value between two contrast peaks (called a double peak). This means that with conventional contrast AF it is not possible to perform automatic focus adjustment with good precision.

In order to handle this phenomenon, therefore, there has been proposed an automatic focus adjustment device wherein a difference image is acquired using an image before lens movement and an image after lens movement, a contrast value for this difference image is calculated, whether or not the contrast value of the difference image is a maximum is determined, and when the contrast value has become a maximum it is determined that the cells are in focus (refer to Japanese patent laid-open No. 2-8-20498 (hereafter referred to as patent publication 2)).

However, depending on the type and shape of the cells, focus position does not always become a minimum position between a double peak, sometimes a single contrast peak (single peak) constitutes a focus position without there being a double peak. Also, at the time of focus detection, because two peaks are close to each other there should actually be a double peak, but a single peak is detected, and in this case focus precision is made worse.

In addition, conditions that will result in peak value becoming a contrast minimum value or a peak position also differ in accordance with incident angle of illumination light on cells in the cell observation device, height of the cell vessel, inclination of a vessel lid etc. Further, peak position of contrast value also changes depending on frequency band for contrast calculation. That is, in a given frequency band focus position becomes a contrast minimum, but if another frequency band is used appearance of a contrast minimum value becomes unlikely, and so it is difficult to uniquely determine frequency band.

SUMMARY OF THE INVENTION

The present invention provides an observation device and focus adjustment method that are capable of detecting focus position with good precision regardless of cell type and environment, such as culture vessel etc.

An observation device of a first aspect of the present invention comprises, an image sensor that forms images of a specimen and outputs an image signal, an AF detection circuit that calculates an evaluation value showing a larger value as degree of focus increases, based on the image signal, and a focus control circuit that changes focus position of the image sensor and controls focus position based on the evaluation value, wherein the AF detection circuit calculates a plurality of evaluation values based on signals relating to a plurality of frequency bands of the image signal, and the focus control circuit controls focus position based on maximum value or minimum value of the plurality of evaluation values corresponding to change in the focus position.

A focus adjustment method of a second aspect of the present invention, this focus adjustment method being a focus adjustment method for an observation device having an image sensor that forms images of a specimen, the focus adjustment method comprising changing focus position of the image sensor, and calculating an evaluation value showing a larger value as degree of focus increases, based on an image signal output by the image sensor, when calculating the evaluation value, calculating a plurality of evaluation values based on signals relating to a plurality of frequency bands of the image signal, and controlling focus position based on maximum value or minimum value of the plurality of evaluation values corresponding to change in the focus position.

A non-transitory computer-readable medium of a third aspect of the present invention, storing a processor executable code, which when executed by at least one processor which is included within an observation device that has an image sensor for forming an image of a specimen, performs a focus adjustment method, the focus adjustment method comprising, changing focus position of the image sensor, and calculating an evaluation value exhibiting a larger value as degree of focus increases, based on an image signal output by the image sensor, when calculating the evaluation value, calculating a plurality of evaluation values based on signals relating to a plurality of frequency bands of the image signal, and controlling focus position based on maximum value or minimum value of the plurality of evaluation values corresponding to change in the focus position.

DETAILED DESCRIPTION OF THE PREFERRED EMBODIMENTS

An example where the present invention has been applied to a cell observation device, as one embodiment of the present invention, will be described in the following using the drawings. With this embodiment, there is an imaging section for forming images of a specimen, an image signal is acquired from the imaging section while changing focus position of the imaging section, and focus position of the imaging section is controlled by calculating focus evaluation values (contrast evaluation values) on this image signal (refer, for example, to S7 in FIG. 7).

Also, when calculating focus evaluation value in this embodiment, a focus evaluation value is calculated for each of a plurality of frequency bands (refer, for example, FIG. 5, FIG. 6, FIG. 9, and FIG. 1). The fact that two peaks in focus evaluation value occur is called a double peak, as was described previously, and in an environment in which it is easy for a double peak to appear, for focus evaluation values of a low frequency a focus position corresponding to a minimum value between the double peak is selected (refer, for example, to FIG. 5, and S27 and S29 in FIG. 8). Also, in an environment where it is difficult for a double peak to appear, a focus position corresponding to a peak of a single peak of focus evaluation value of a high frequency is selected (refer, for example, to FIG. 6 and S35 and S37 in FIG. 8).

Figure 8:
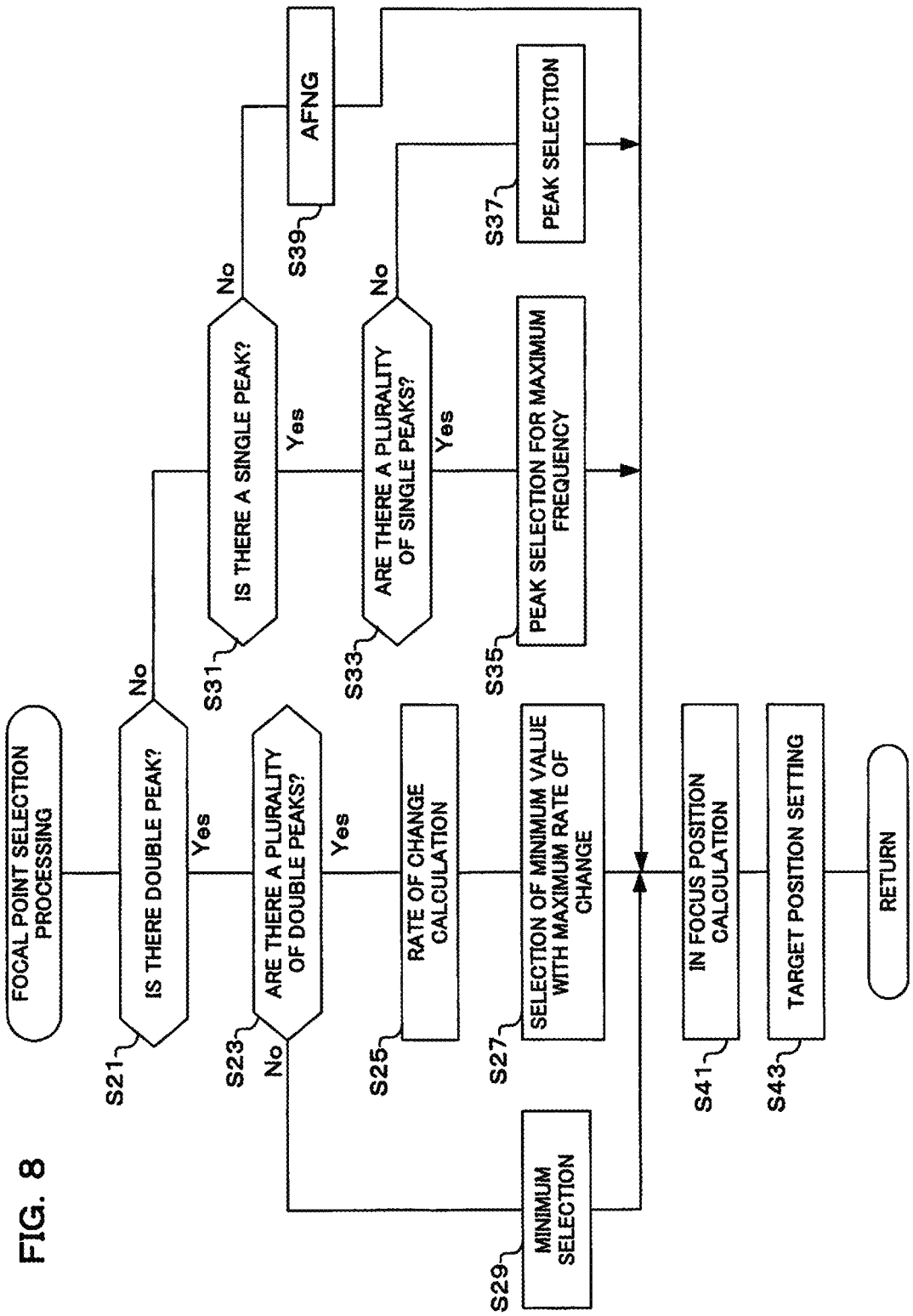
FIG. 8 is a flowchart showing operation of focal point selection processing in the cell observation device of one embodiment of the present invention.

More specifically, in a case where focus evaluation value has been calculated in a plurality of frequency bands, if a double peak appears in a plurality of bands (a plurality of double peaks), a focus position that gives in focus position is selected based on rate of change of the focus evaluation value (refer, for example, to S23 Yes, S25 and S27 in FIG. 8). On the other hand, if focus evaluation value is calculated for each of a plurality of frequency bands and only a single double peak appears, a focus position that gives a minimum focus evaluation value is selected (refer, for example, to S23 No and S29 in FIG. 8). If a plurality of single peaks have appeared when a double peak has not appeared in focus evaluation value, then a focus position corresponding to a peak of the maximum frequency is selected (refer, for example, to S21 No, S31 Yes, S33, and S35 in FIG. 8). When only a single peak appears, a focus position corresponding to that peak is selected (refer, for example, to S21 No, S33 No and S37 in FIG. 8).

Figure 1:
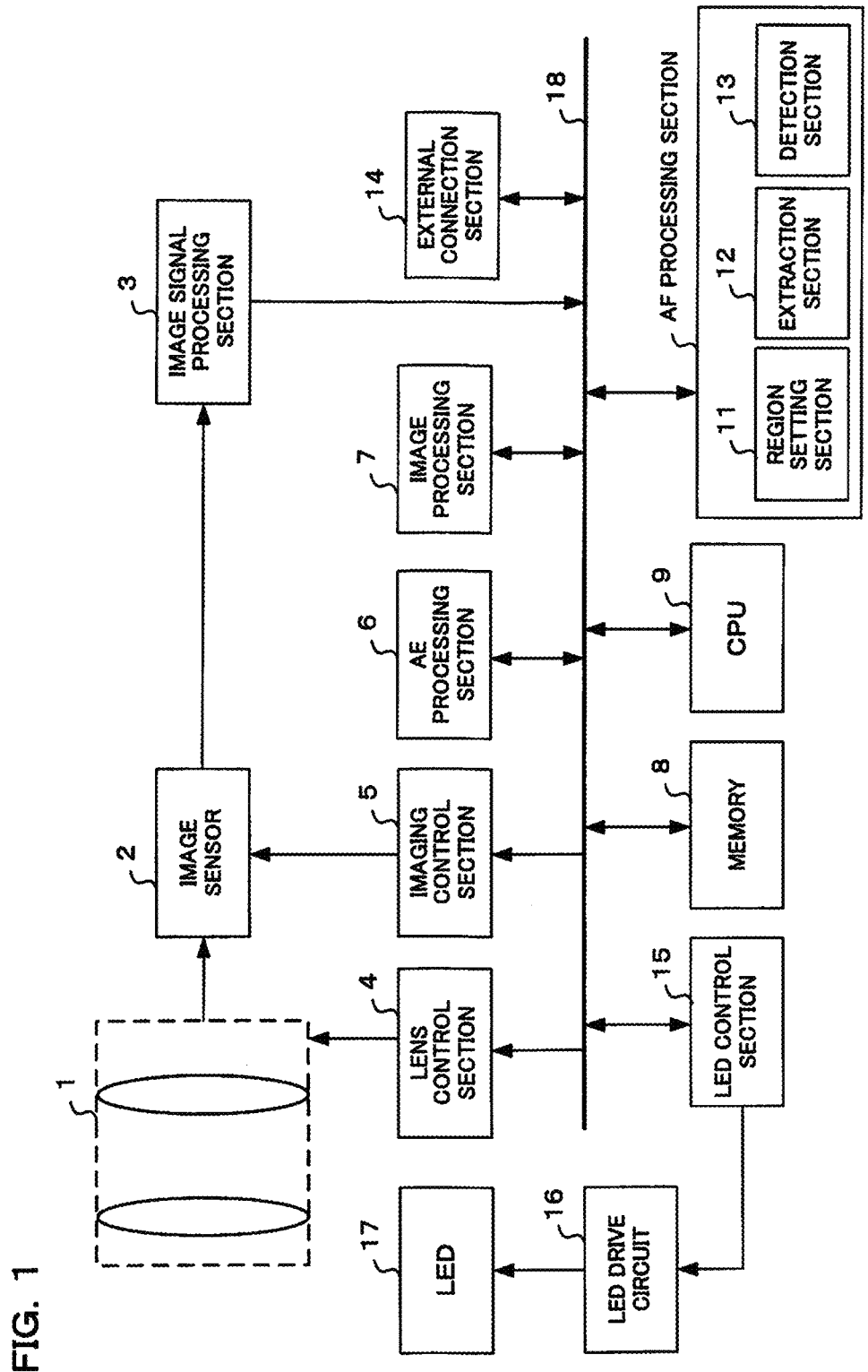
FIG. 1 is a block diagram showing overall structure of a cell observation device of one embodiment of the present invention.

FIG. 1 is a block diagram showing structure of a cell observation device of this embodiment. An optical system 1 includes a focus lens, which is a prime lens or a zoom lens, and forms an optical image of a specimen. This optical system 1 is moved in the optical axis direction using a lens drive motor and a lens drive mechanism, and performs focusing of an image of a specimen such as cells. The optical system 1 may also be an entire group extending type with which all groups of a lens formed for focusing are moved integrally in an optical axis direction. While FIG. 1 does not show an aperture and mechanical shutter on the optical axis of the optical system 1, these components may be provided, or they may be omitted.

An image sensor 2 is an image sensor such as a CCD (Charge Coupled Device) image sensor or a CMOS (Complementary Metal Oxide Semiconductor) image sensor, and generates image signals by subjecting an image that has been formed by the optical system 1 to photoelectric conversion. The image sensor 2 is connected to an imaging control section 5. The imaging control section 5 has an imaging control circuit, and performs charge storage control and control of image signal readout for the image sensor 2 in accordance with control signals from a CPU (Central Processing Unit) 9. The image sensor 2 functions as an imaging section (image sensor) that forms an image of a specimen.

An image signal processing section 3 has an image signal processing circuit, is input with an image signal from the image sensor 2, performs processing such as A/D conversion, and outputs image data to a bus 18. This image data is input to an AE processing section 6, image processing section 7 and AF processing section 10 etc. and subjected to processing. The AE processing section 6 has an AE (automatic exposure control) circuit, detects brightness of a specimen etc. based on image data, and outputs detection results to the CPU 9. The CPU 9 performs control of imaging so that an image signal from the image sensor 2 becomes correct, based on brightness information. The image processing section 7 has an image processing circuit and subjects image data to various image processing such as OB (Optical Black) subtraction processing, white balance correction, demosaicing processing, edge enhancement processing, and image compression and image expansion.

The AF processing section 10 has an AF (automatic focus adjustment) circuit, and has a region setting section 11, extraction section 12, and detection section 13. The region setting section 11 sets some or all regions within a taken image as focus detection areas. This setting may be performed manually by the user, and also, if a taken image has been subjected to image analysis and cells etc. detected, that area where cells have been detected may be set automatically as a focus detection area.

The extraction section 12 has an extraction circuit, such as a filter circuit, and extracts signal components of a specified frequency band from within image data of a focus detection area that was set by the region setting section 11. The extraction section 12 extracts high-frequency signal components of a plurality of frequency bands, for a single focus detection area. Also, high-frequency signal components are extracted using a digital high-pass filter, for example.

The detection section 13 has a detection circuit (evaluation value detection circuit or AF detection circuit) such as an integration circuit, and calculates focus evaluation value (corresponding to contrast) by integrating signal components that have been extracted. This focus evaluation value becomes a bigger value as degree of focus becomes higher. Calculation of focus evaluation value is performed for each of a plurality of frequency bands. Here, a focus evaluation value that has been calculated is output to the CPU 9, and the CPU performs focus adjustment of a focus lens of the optical system 1 by means of a lens control section 4. It should be noted that within the processing of the AF processing section 10, functions of some sections, such as the region setting section 11, extraction section 12, detection section 13 etc. may also be implemented by the CPU 9. In a case where signal components of a specified frequency band have been extracted by the CPU 9, or where focus evaluation value has been calculated, the CPU may provide a function as an extraction circuit and an AF detection circuit.

The detection section 13 functions as an evaluation value detection section (AF detection circuit) that calculates an evaluation value that has a larger value as degree of focus increases, based on an image signal output by the imaging section (image sensor). This evaluation value detection section (AF detection circuit) calculates a plurality of evaluation values based on signals relating to a plurality of frequency bands of the image signal (refer, for example, to FIG. 5, FIG. 6, and S7 in FIG. 7).

The lens control section 4 has a lens control circuit, and performs drive control of a lens drive motor based on drive commands for the focus lens from the CPU 9. As drive control for the focus lens, there are scan drive and focus drive. Scan drive is drive that moves the focus lens to an initial position, and moves the focus lens from this initial position to an endpoint or a specified target position. Image data is acquired while performing scan drive, and focus evaluation values are calculated based on this image data that has been acquired. In focus position is calculated based on this focus evaluation value. Focus drive is drive that moves the focus lens to an in focus position that was calculated using scan drive. As a result of this focus drive it is possible for the optical system 1 to focus on a specimen, such as cells.

The lens control section 4 functions as a focus control section (focus control circuit) that changes focus position of the imaging section (image sensor), and controls focus position based on evaluation value. Specifically, the focus control section (focus control circuit) changes the focus position to the imaging surface of the image sensor. This focus control section (focus control circuit) controls focus position based on a maximum value or minimum value of a plurality of evaluation values corresponding to change in focus position (refer, for example, to S13 in FIG. 7, and FIG. 8 to FIG. 10). The focus control section (focus control circuit) also controls focus position by selecting a focus positions corresponding to a maximum value or minimum value of a plurality of evaluation values (refer, for example, to S13 in FIG. 7, and FIG. 8 to FIG. 10).

Figure 9:
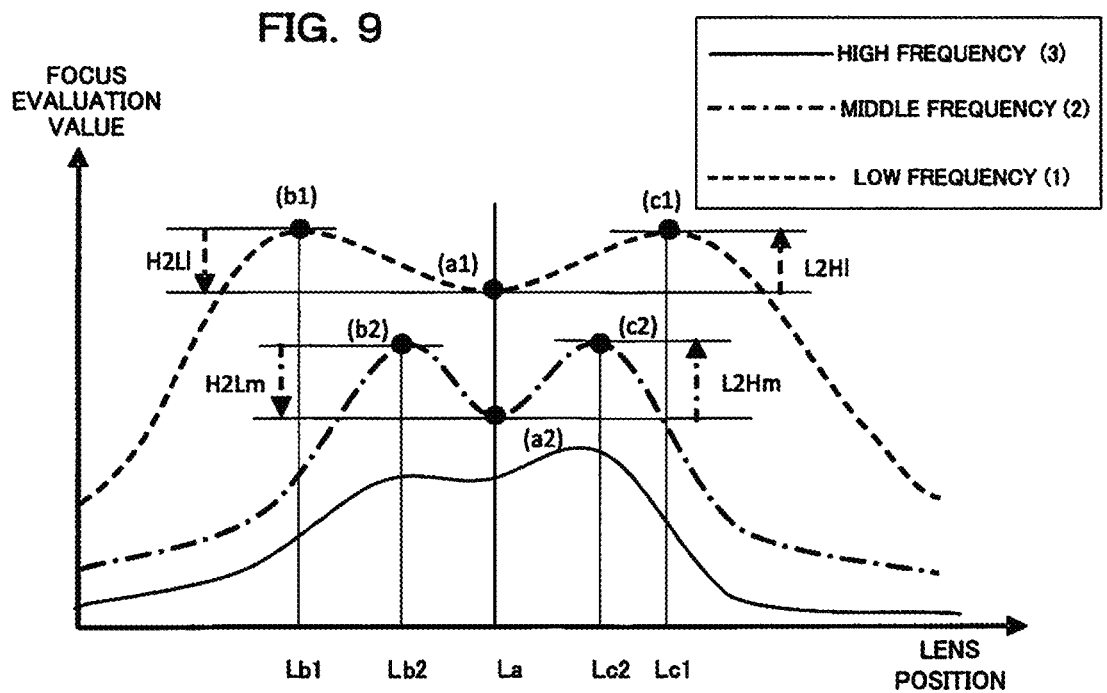
FIG. 9 is a graph showing focus evaluation value in a case where a double peak exists in a plurality of frequency bands, in the cell observation device of one embodiment of the present invention.

Also, in a case where respective minimum values are detected in a plurality of evaluation values, the previously described focus control section (focus control circuit) selects focus position based on rate of change of evaluation value corresponding to respective minimum values (refer, for example, to S25 and S27 in FIG. 8, and FIG. 9). The focus control section (focus control circuit) selects a focus position corresponding to a minimum value for which rate of change of evaluation value corresponding to respective minimum values of a plurality of evaluation values is larger (refer, for example, to S27 in FIG. 8, and to FIG. 9). In the event that, among a plurality of evaluation values, a minimum value of evaluation value relating to a high frequency does not exist, the focus control section (focus control circuit) selects a focus position corresponding to a minimum value of evaluation value relating to a lower frequency wave (refer, for example, to selection of lens position La in FIG. 9). It should be noted that focus lens drive control may be performed by the CPU 9, and in this case the CPU 9 functions as a focus control circuit. Also, with this embodiment, focusing is performed by moving the focus lens in the optical axis direction. However, this is not limiting, and it is also possible to move the position of the image sensor in the optical axis direction with respect to the focus lens. In this case, the focus control circuit moves position of the image sensor.

An external connection section 14 is an interface for connecting the focus detection apparatus and an external device (for example, a server that controls a focus detection apparatus). An LED (Light Emitting Diode) 17 is a light source for illuminating a specimen such as cells, and lighting control (control of commencement of light emission and stopping of light emission) of the LED 17 is performed by an LED drive circuit 16 in accordance with control signals from an LED control section 15. The LED control section 15 has an LED control circuit, and lighting control may be performed by this control circuit, and lighting control may be performed by the CPU 9 having the function of the LED control section 15. It should be noted that light sources other than LEDs, such as a tungsten light bulb, may be adopted instead of the LED 17.

The CPU 9 performs control for each section within the cell observation device in accordance with a program that is stored in a memory 8. The CPU 9 has a controller for overall control of the cell observation device, and the CPU 9 is arranged as part of a so-call ASIC (Application Specific Integrated Circuit). Besides the CPU, there are also peripheral circuits in this ASIC. As peripheral circuits there may be some or all of the previously described lens control circuit, imaging control circuit, AE control circuit, image processing circuit, LED control circuit, AF processing circuit (extraction circuit, AF detection circuit) etc.

The memory 8 includes electrically rewritable volatile memory and non-volatile memory, and as well as the previously described programs stores various data such as image data, and various adjustment values for the cell observation device.

Next, a case where focus evaluation value becomes a double peak, when focus position of the optical system 1 has been changed, will be described using FIG. 2. The dashed lines represent illumination light L, and the illumination light L that is irradiated light of the LED 17 is irradiated as light that is substantially parallel to a cell 81, which is a specimen. This illumination light L that has been irradiated passes through the cell 81. It should be noted that in FIG. 2, reference numeral 81b represents an image of a cell 81 at the imaging surface position (p). Also, a portion where intersecting diagonals have been applied in cells 81 and 81b shows a nucleus of a cell.

When the illumination light L passes through a cell 81, since the shape of the cells 81 is a projecting shape, a light beam is refracted and a light condensing effect is produced. Therefore, when the illumination light L that has passed through the cell 81 forms an image on an imaging surface (p) by means of the optical system 1, if there is deviation from the focus position sparseness and density (light beam disparity) will arise in the light beam, and sparse portions (dark portions) and dense portions (bright portions) will occur in the image of the specimen. In a case where sparseness and density arise in the light beam, a focus evaluation value (contrast value) causes a peak to be generated around a best focus position (corresponding to imaging surface position p). A case where focus evaluation value becomes a double peak will be described later using FIG. 3.

For a light beam that has passed through the cell 81 and the optical system 1, as an imaging optical system, at imaging surface position (r), which is at a nearer side than the best focus position, light beams becomes dense in a region of low refractive index close to a cell boundary, while on the other hand light beams become sparse in a region of high refractive index inside a cell. As a result, close to a cell boundary becomes bright while inside a cell boundary becomes dark. At an imaging surface position (p), which is the best focus position, light beam density becomes uniform, and as a result an observation image of a cell becomes distinct and easy to visually recognize. At imaging surface position (q) which is behind the best focus position light beams become sparse in a region of low refractive index close to a cell boundary, but become dense in a region of high refractive index inside a cell boundary. As a result, close to a cell boundary becomes dark, while inside as cell becomes bright.

Figure 4A:
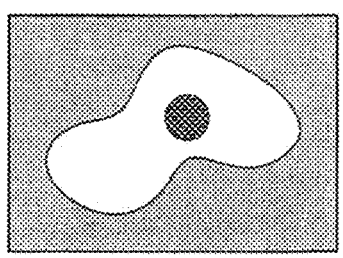
FIG. 4A to FIG. 4C are drawings showing examples of taken images, in a cell observation device of one embodiment of the present invention.

As has been described above, sparseness and density of light beams in the vicinity of a cell boundary differs depending on the imaging surface position. As result in an image of the cells 81a at imaging surface position (r) a boundary of the cell 81 becomes white and inside the cell boundary becomes black, as shown in FIG. 4C. Also, an image of the cell 81 at imaging surface position (p) becomes a focused image, as shown in FIG. 4A. As a result, this taken image is an image at the best focus position Pb (corresponding to position p in FIG. 2), and is suitable for observing a cell 81 that is in focus. Also in an image of the cell 81 at imaging surface position (q) a boundary of the cell 81 becomes black and inside the cell boundary becomes white, as shown in FIG. 4B.

Figure 2:
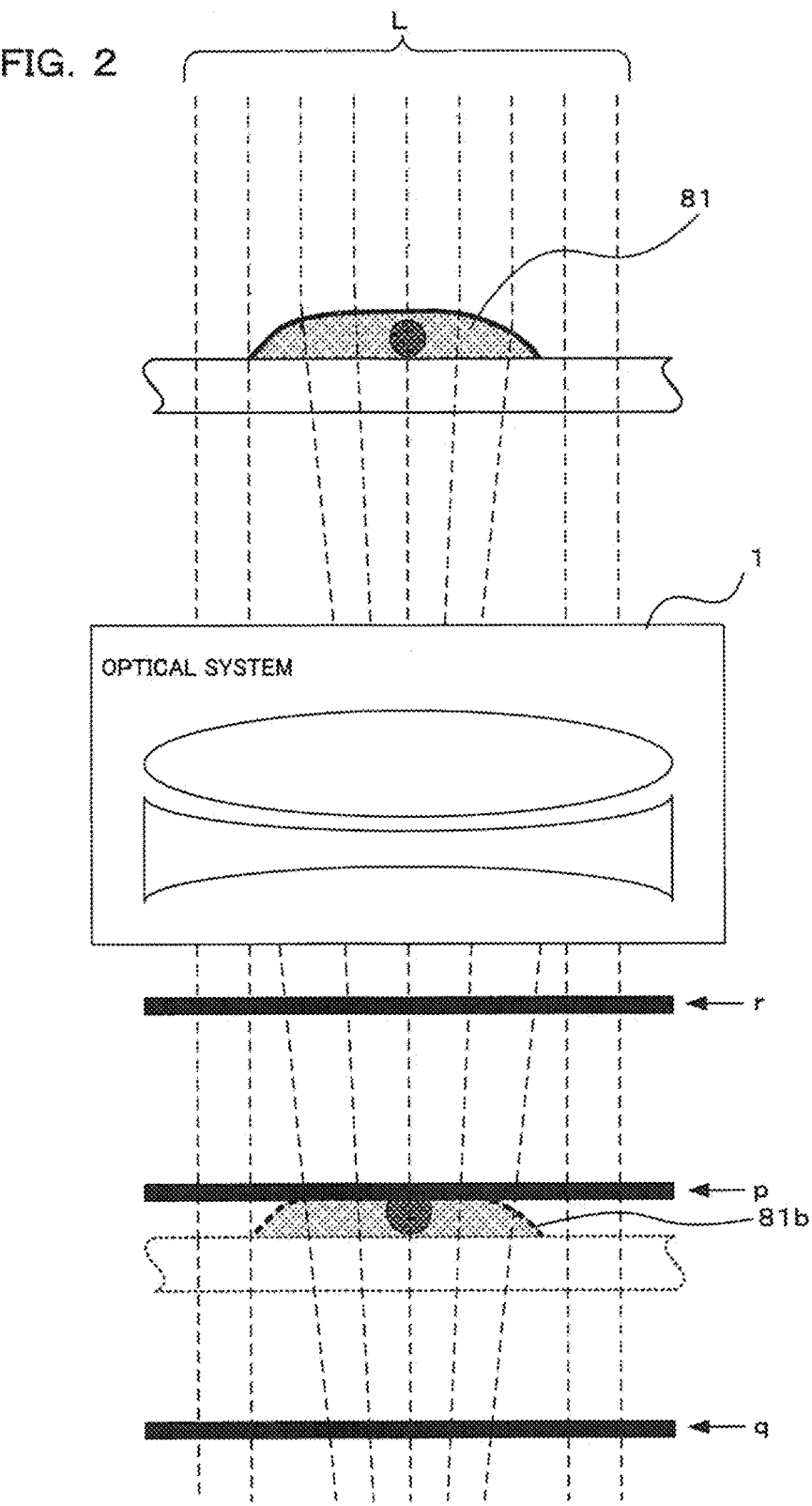
FIG. 2 is a drawing showing light paths of light beams that have passed through a cell, in the cell observation device of one embodiment of the present invention.
Figure 3:
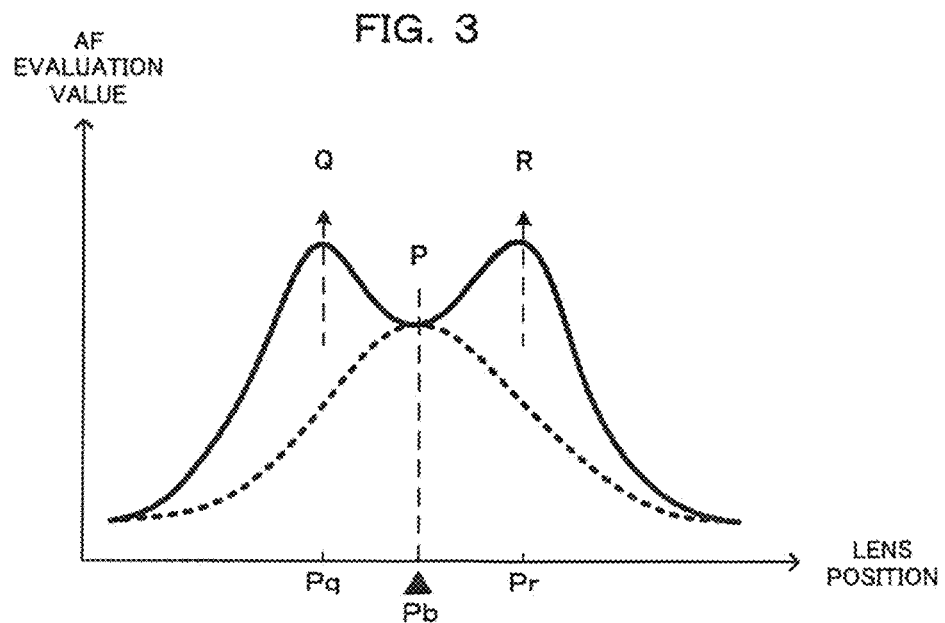
FIG. 3 is a graph showing an example of a relationship between lens position and focus evaluation value for the imaging section (in a case where there are two peaks), in the cell observation device of one embodiment of the present invention.

FIG. 3 shows change in focus evaluation value, for a case where sparseness and density have occurred in transmitted light flux due to a light condensing effect caused by the projecting shape of the cell 81, as a solid line, as shown in FIG. 2. In FIG. 3, the line shown by a dashed line shows change in focus evaluation value for a case where there is not a light condensing effect.

In FIG. 3, the line shown by a solid line shows change in focus evaluation value for a case where there is a light condensing effect. At lens position Pq and lens position Pr of the focus lens of the optical system 1, focus evaluation value becomes a maximum value, and at the best focus position Pb the focus evaluation value becomes a minimum value.

Figure 4B:
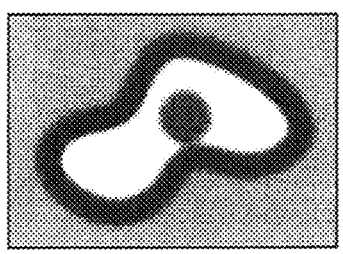
Figure 4C:
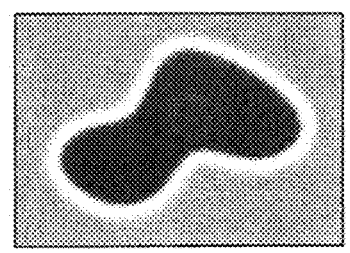

FIG. 4A to FIG. 4C show taken images of a cell at each point of lens positions Pq, Pb and Pr in FIG. 3. As was described previously, the image shown in FIG. 4A is an image at the lens position Pb point in FIG. 3. The image shown in FIG. 4B is an image at the lens position Pq point in FIG. 3 formed with a region of high refractive index dark and with a region of low refractive index (called a positive or dark contrast) bright. The image shown in FIG. 4C is an image at the lens position Pr point in FIG. 3, and an image, that has been formed that is bright in a region of high refractive index and dark in a region of low refractive index (called a negative or bright contrast), is formed.

Figure 5:
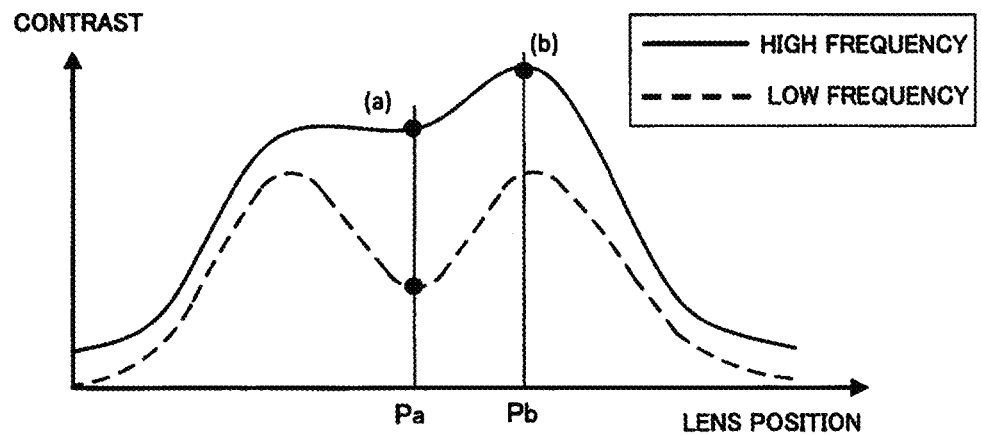
FIG. 5 is a graph showing examples of a relationship between lens position and focus evaluation value for the imaging section (high frequency and low frequency), in an environment where a double peak is likely, in the cell observation device of one embodiment of the present invention.
Figure 6:
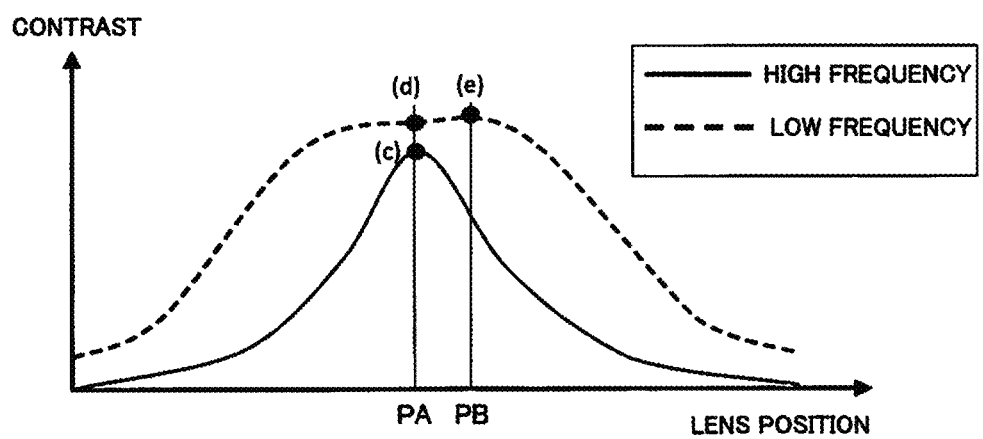
FIG. 6 is a graph showing examples of a relationship between lens position and focus evaluation value for the imaging section (high frequency and low frequency), in an environment where a double peak is unlikely, in the cell observation device of one embodiment of the present invention.

Next, contrast characteristics for a frequency band when calculating contrast will be described using FIG. 5 and FIG. 6. Contrasts (focus evaluation values) that have been respectively calculated for signal components of two different frequency bands are shown in FIG. 5 and FIG. 6. The dashed line is contrast corresponding to a low frequency, and the solid line is contrast corresponding to a higher frequency wave. There is a property (feature) such that a low frequency contrast is likely to produce a double peak, while a high frequency is unlikely to produce a double peak. Also, FIG. 5 shows change in contrast in an environment in which it is easy for a double peak to appear, while FIG. 6 shows change in contrast in an environment where it is difficult for a double peak to appear.

As was described previously, FIG. 5 is an environment in which it is easy for a double peak to appear (light condensing effect of cells is large etc.), and this means that it is easy for low frequency contrast to become a double peak. In FIG. 5 since a double peak appears in the low-frequency contrast, lens position Pa corresponding to minimum contrast is selected as in focus position. On the other hand, since high-frequency contrast has a characteristic such that it is difficult for a double peak to occur, two peaks (peak value (a) and peak value (b)) are close together, a contrast value does not become a minimum at the same position as the lens position Pa corresponding to the minimum for low-frequency contrast, and contrast change in the vicinity of lens position Pa is not seen, as shown in FIG. 5. Accordingly, if determination is performed only with high frequency contrast under the conditions of FIG. 5, lens position Pb corresponding to peak value (b) will be wrongly made the in focus position, and focused position will get worse.

Therefore, in a case where double peaks appear, if only one such double peak appears a peak of high-frequency contrast is not selected and a minimum of contrast (focus evaluation value) that has appeared in the double peak is selected (referred to S23 No and S29 in FIG. 8, which will be described later). It should be noted that in this case, in the event that a minimum value of evaluation value relating to a higher frequency wave does not exist within a specified range from a focus position corresponding to a minimum value of low frequency contrast, a focus position corresponding to a minimum value of evaluation value relating to a lower frequency wave may be selected as in focus position. Also, a case where a plurality of double peaks appear will be described later using FIG. 8 and FIG. 9.

FIG. 6 shows change in contrast in an environment in which it is difficult for a double peak to appear (light condensing effect of cells is small etc.). In this case, with contrast that has been detected from a high frequency a steep peak value (c) appears at lens position PA. On the other hand with contrast that has been detected from a low frequency, there is a contrast value (d) at the same position as lens position PA where contrast of a high frequency becomes peak value (c), and the contrast value (d) is in a state where contrast change is not seen, and a double peak is not determined. With the example shown in FIG. 6, low frequency contrast becomes a peak contrast value (e) that is slightly larger than contrast value (d), at lens position PB.

With the example shown in FIG. 6, since all contrasts (high frequency and low frequency) are not a double peak, it is possible to obtains a high precision in focus position by making lens position PA corresponding to peak value (c) of the highest frequency contrast an in focus position. Conversely, if only low frequency contrast is used under the conditions of FIG. 6, lens position PB corresponding to peak value (e) will be wrongly made an in focus position, and it will not be possible to obtain a high precision in focus position.

Next, AF operation of this embodiment will be described using the flowcharts shown in FIG. 7 and FIG. 8. This flowchart is executed by the CPU 9 controlling each of the sections within the cell observation device in accordance with program code that has been stored within the memory 8.

Figure 7:
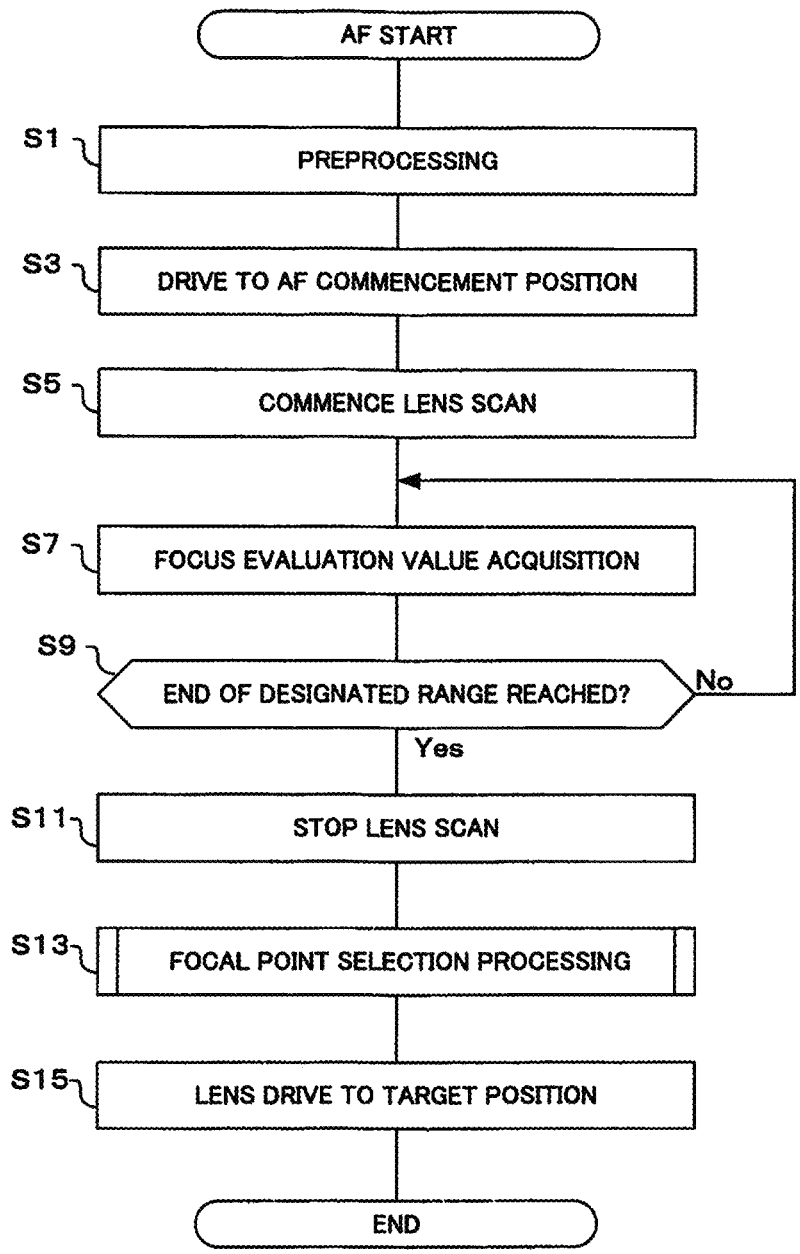
FIG. 7 is a flowchart showing contrast AF operation in the cell observation device of one embodiment of the present invention.

If the flow shown in FIG. 7 is commenced, preprocessing is first performed (S1). Here, the CPU 9 sets exposure control values for AF based on brightness information from the AE processing section 6, and performs exposure control so as to achieve appropriate exposure using the imaging control section 5. Also, a focus detection area is set by the region setting section 11.

Once preprocessing has been performed, next there is drive to an AF commencement position (S3). Here, the CPU 9 moves the focus lens position of the optical system 1 to a commencement position by means of the lens control section 4. In a case where the focus lens is moved by the stepping motor, focus lens position is detected using a number of pulses that have been input to the stepping motor from a point in time when a reference is passed. Also, in a case where an encoder is provided that measures focus lens position, focus lens positioned is detected based on encoder output. With this embodiment, a specimen such as cells, which is the subject of focus adjustment, is within a specified range, and focusing of the optical system 1 is performed in a designated range that is set from an external device that has been connected to the external connection section 14, and so focusing is commenced from one end of the designated range. Therefore, information on AF commencement position and an end point (reached point) of the designated range is input from an external device by means of the external connection device 14, as the designated range.

Once the focus lens has been driven to the AF commencement position, next, lens scan is commenced (S5). Scan drive is drive for detecting focus evaluation value (contrast). Here, the CPU 9 moves the focus lens of the optical system 1 at a specified speed by means of the lens control section 4.

If lens scan has been commenced, next focus evaluation value (corresponding to contrast) is acquired (S7). Here, if image data for a single frame is acquired while performing focus lens drive, the extraction section 12 extracts frequency signal components of a plurality of frequency bands from image data of a focus area that has been set by the region setting section 11. Then, the detection section 13 calculates focus evaluation value (corresponding to contrast) by integrating signal components that have been extracted for each frequency band. Accordingly, focus evaluation values for a plurality of frequency bands are acquired for a single focus detection area.

If focus evaluation values have been acquired, it is next determined whether or not the end of a designated range has been reached (S9). Here, it is determined whether or not end point of the designated range that was input from the external connection section 14 has been reached. Specifically, it is determined whether an endpoint of the designated range, that is an endpoint in an opposite direction to the scan commencement position, has been reached. If the result of this determination is that the endpoint has not been reached, processing returns to step S7, and acquisition of focus evaluation values continues.

If the result of determination in step S9 is that endpoint of the designated range has been reached, lens scan is stopped (S11). The CPU 9 stops scan drive of the focus lens after focus evaluation values have been acquired for the designated range.

Next, focal point selection processing is performed (S13). As was described previously, the focus evaluation values are calculated for each of a plurality of frequency bands. With this focal point selection processing, it is determined which peak of which frequency band, among the plurality of focus evaluation values, will be selected as an in focus position. Detailed operation of this focal point selection processing will be described later using FIG. 8.

If focal point selection processing has been performed, next the lens is driven to a target position (S15). Here, the CPU 9 drives the focus lens to an in focus position that was selected in step S13, as a target position, by means of the lens control section 4.

Next, detailed operation of focal point selection processing (refer to S13 in FIG. 7) will be described using the flowchart shown in FIG. 8. With this focal point selection processing, there is processing to determine a definitive focus position from focus evaluation values that have been calculated for each of different frequency bands.

If the flow for focal point selection processing is entered, it is first determined whether or not there is a double peak (S21). In the graph shown in FIG. 3, the solid line is a case of a double peak. Here, the CPU 9 determines whether or not there are at least two points, within focus evaluation values of a plurality of different frequency bands, that are transitioning from increasing to decreasing, namely whether or not there is at least one double peak. For example, in a case where focus evaluation values have been calculated for two frequency bands, if there is a double peak in at least one frequency band the determination in step S21 becomes Yes.

If the result of determination in step S21 is that there is a double peak, it is next determined whether or not there are a plurality of double peaks (S23). Here, the CPU 9 performs determination as to whether or not there are double peaks in a plurality of frequency bands.

If the result of determination in step S23 is that there are a plurality of double peaks, next rate of change is calculated (S25). Here, the CPU 9 calculates rate of change for respective minimums of a graph of focus evaluation values for each of a plurality of frequency bands (change corresponding to lens position). This calculation of rate of change will be described later using FIG. 9.

If rate of change has been calculated, next a minimum value with a maximum rate of change is calculated (S27). Here, the CPU 9 selects a minimum for the frequency band having the largest rate of change, among rates of change of respective minimums that were calculated in step S25.

Returning to step S23, if the result of this determination is that there are not a plurality of double peaks, a minimum of a double peak is selected (S29). This is a case where there is only a single double peak among the focus evaluation values of different frequency bands. In this case, the CPU 9 selects the minimum value of the only one double peak.

Returning to step S21, if the result of determination here is that there is not even one double peak, it is determined whether or not there is a single peak (S31). Here, the CPU 9 determines whether or not focus evaluation values for at least one frequency band among the different frequency bands transition from increasing to decreasing at a single point, namely whether or not there is a single peak.

If the result of determination in step S31 is that there is a single peak, it is next determined whether or not there are a plurality of single peaks (S33). Here, the CPU 9 performs determination as to whether or not there is a single peak in a plurality of frequency bands.

If the result of determination in step S33 is that there are a plurality of single peaks, a peak of the maximum frequency is selected (S35). This is a case where there are single peaks in a plurality of frequency bands, and in this case the CPU 9 selects a single peak of focus evaluation value for a frequency band having the highest frequency. Detailed operation of this maximum frequency peak selection will be described later using FIG. 10.

On the other hand, if the result of determination in step S33 is that there are not a plurality of single peaks, namely that there is only one single peak, the peak is selected (S37). In this case, the CPU 9 selects the only one single peak.

Returning to step S31, if the result of determination in this step is that there is not a single peak AF is set to NG (S39). This is a case where there is neither a double peak nor a single peak, and in this case it is not possible to select an in focus position. The CPU 9 therefore determines focus not possible (AFNG).

If the selection of steps S27, S29, S35 or S37 has been performed, or if AFNG has been set in step S39, next calculation of in focus position is performed (S41). Here, the CPU 9 calculates in focus position from a position that was selected in step S27, S29, S35 or S37. With in focus position calculation, interpolation calculation may be performed using lens positions corresponding to a plurality of discrete focus evaluation values that contain a minimum or a peak.

Once in focus position has been calculated, next a target position is set (S43). Here, the CPU 9 sets in focus position that was calculated in step S41 to a target position for when driving the focus lens. It should be noted that in the event that AFNG is set in step S39, a focus position that has been designated in advance by an external device, or an initial value that has been designated within the cell observation system, is set to the target position.

If target position for the focus lens has been set, the flow for focal point selection processing is terminated, and the originating flow is returned to.

Next, calculation of rate of change in step S25 will be described using FIG. 9. FIG. 9 shows detection of focus evaluation values in three different frequency bands, as a plurality of frequency bands, and shows change in focus evaluation value with lens position in a case where double peaks exist. With the example shown in FIG. 9, focus evaluation values of a frequency band (middle frequency) that is higher than the low frequency (shown by a dashed line) and lower than the high frequency (shown by a solid line), that were shown in FIG. 5 and FIG. 6, are shown by a dot and dash line.

With the example shown in FIG. 9, a double peak appears in the low frequency (dashed line) and in the middle frequency (dot and dash line), and a double peak does not appear in the high frequency (solid line). The high frequency has a property (feature) that it is generally difficult for a double peak to occur, and as shown in FIG. 9 two peaks are close together, there is no minimum at the same position as a minimum value (a1) of focus evaluation values for lens position La for the low frequency, and change in contrast is not seen.

On the other hand, under these conditions, since a double peak is detected for focus evaluation values of the low frequency and middle frequency, a focus position where there is a minimum value is selected as in focus position. Here, a lens position exists corresponding to two minimum values, namely minimum value of the low frequency (a1) and minimum value of the middle frequency (a2). In this case a lens position corresponding to either minimum value is selected. This selection is determined by minimum degree of focus evaluation value. Specifically, determination uses a rate of decrease from a peak to a minimum (H2L) and a rate of increase from minimum to peak (L2H). Rate of decrease and rate of increase are called rate of change.

Reduction rate (H2L) from peak to minimum is obtained as change from (b1) to (a1) shown by equation 1 with the low frequency, and from (b2) to (a2) shown by equation 2 with the middle frequency.

$$H2Ll=(b1-a1)/b1 \qquad \text{(equation 1)}$$

$$H2Lm=(b2-a2)/b2 \qquad \text{(equation 2)}$$

On the other hand, increase rate (L2H) from minimum to peak is obtained as change from (a1) to (c1) shown by equation 3 with the low frequency, and from (a2) to (c2) shown by equation 4 with the middle frequency.

$$L2Hl=(c1-a1)/a1 \qquad \text{(equation 3)}$$

$$L2Hm=(c2-a2)/a2 \qquad \text{(equation 4)}$$

In this way, rate of change for evaluation value can be calculated using reduction rates from peaks of a plurality of evaluation values to a minimum value, or increase rate from minimum value to peak.

Alternatively, rate of change may be selected by inclination from peak to minimum and inclination from minimum to peak. From a lens position corresponding to the peak position that was shown in FIG. 9, inclination LS1 for the low frequency (inclination from peak to minimum) is obtained by equation 5, and inclination LS2 (inclination from minimum to peak) is obtained by equation 6.

$$LS1=(b1-a1)/(Lb1-La) \qquad \text{(equation 5)}$$

$$LS2=(c1-a1)/(Lc1-La) \qquad \text{(equation 6)}$$

Similarly, inclination HS1 for the middle frequency (inclination from peak to minimum) is obtained by equation 7, and inclination HS2 (inclination from minimum to peak) is obtained by equation 8.

$$HS1=(b2-a2)/(Lb2-La) \qquad \text{(equation 7)}$$

$$HS2=(c2-a2)/(Lc2-La) \qquad \text{(equation 8)}$$

It should be noted that in (equation 5) to (equation 8) described above, an inclination that becomes a negative value is taken as an absolute value to be compared. In this way, rate of change of evaluation value may be set to an absolute value of inclination from peak of a plurality of evaluation values to a minimum value, or inclination from a minimum value to peak.

In this way, in a case where a plurality of minimums have been detected, if a steeper minimum is selected using the previously described minimum degree (rate of change), it is possible to obtain an in focus position of higher precision.

Figure 10:
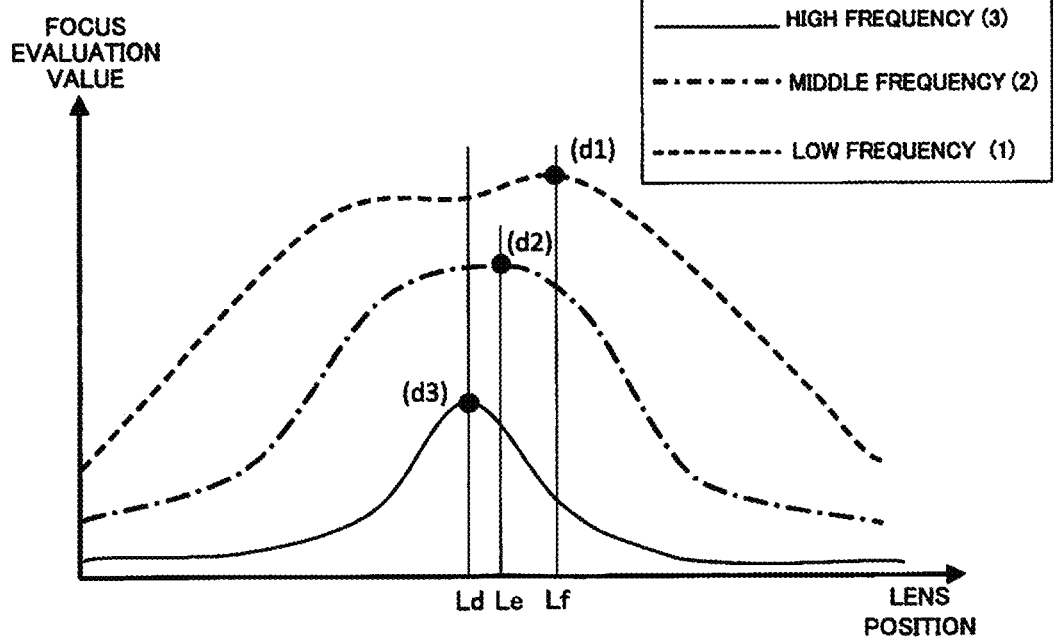
FIG. 10 is a graph showing focus evaluation value in a case where not a single double peak exists in a plurality of frequency bands, in the cell observation device of one embodiment of the present invention.

Next, selection of a peak of maximum frequency in step S35 will be described using FIG. 10. FIG. 10 shows results of having detected focus evaluation values in three different frequency bands, as a plurality of frequency bands, and shows change in focus evaluation value with lens position in a case where double peak does not exist but a single peak exists in a plurality of frequency band. With the example shown in FIG. 10, similarly to FIG. 9, focus evaluation values of a frequency band (middle frequency) that is higher than the low frequency (shown by a dashed line) and lower than the high frequency (shown by a solid line), that were shown in FIG. 5 and FIG. 6, are shown by a dot and dash line.

With the example shown in FIG. 10, it is an environment in which it is difficult for a double peak will appear, and there is not a double peak in all of the low frequency, the middle frequency and the high frequency. With a high frequency, a steep peak (d3) appears at lens position Ld. On the other hand, the low frequency does not become a peak at the same position as lens position Ld where the peak value (d3) of the high frequency was realized, but becomes a peak value (d1) at lens position Lf that is shifted from lens position Ld. Also, the middle frequency becomes a peak value (d2) at lens position Le that is shifted from lens position Ld, and further, there is no focus evaluation value change in the vicinity of the peak, and so it is not possible to obtain an in focus position of high precision.

This means that in a case where a double peak does not exist in focus evaluation values and there is a single peak in a plurality of frequency bands, it is possible to obtain an in focus position of high precision by making lens position Ld, where focus evaluation values of the highest frequency become peak value (d3), an in focus position.

As has been described above, with the one embodiment of the present invention, an evaluation value having a larger value as degree of focus increases is calculated based on an image signal that is output by an imaging section (image sensor), when calculating evaluation values a plurality of evaluation values are calculated based on signals relating to a plurality of frequency bands of the image signal (refer, for example to S7 in FIG. 7, and to FIG. 5 and FIG. 6), and focus position is controlled based on a maximum value or minimum value of a plurality of evaluation values corresponding to change in focus position (refer, for example, to FIG. 8). This means that it is possible to detect a focus position of good precision without regardless of type of cells, and culture vessel etc. Specifically, depending on a specimen, such as cells, a double peak may appear in focus evaluation values, or only a single peak may appear. According to this embodiment, in either case a plurality of evaluation values are calculated based on signals relating to a plurality of frequency bands, and focus control is performed based on a maximum value or minimum of these plurality of evaluation value, and so it is possible to detect focus position with good precision, regardless of the type of cells etc.

It should be noted that with the one embodiment of the present invention, as the plurality of frequency bands, description has been given for two frequency bands (refer to FIG. 5 and FIG. 6), and for three frequency bands (FIG. 9 and FIG. 10), but this is not limiting and focus evaluation values may also be calculated for four or more frequency bands.

Also, with the one embodiment of the present invention, as focus evaluation values description has been given of examples where one maximum value is calculated in the case of a single peak, and two maximum values and one minimum value are calculated in the case of a double peak. However, conversely focus evaluation values may also be calculated so that there is one minimum value in the case of a single peak and two maximum value in the case of a double peak.

Also, with the one embodiment of the present invention, focus adjustment was performed by moving the optical system 1 using the lens control section 4. However, this is not limiting, and focus may also be adjusted by moving the image sensor 2 in the optical axis direction of the optical system 1, and focus may also be adjusted by moving a specimen, such as cells or a cell vessel, in the optical axis direction of the optical system 1

Also, with the one embodiment of the present invention, the image signal processing section 3, lens control section 4, imaging control section 5, AE processing section 6, image processing section 7, AF processing section 10, region setting section 11, extraction section 12, detection section 13, external connection section 14, LED control section 15 etc. are constructed separately from the CPU 9. However, this is not limiting and some or all of these sections may be constructed as software, and executed by the CPU 9. It is also possible for some or all of these sections, and functions of the CPU 9, to have a hardware structure such as gate circuits generated based on a programming language that is described using Verilog, and also to use a hardware structure that utilizes software such as a DSP (digital signal processor). Suitable combinations of these approaches may also be used.

Also, with the one embodiment of the present invention description has been given using a cell observation device as a device for focus adjustment. However, not being limited to cells, the present invention can also be applied to any device as long as imaging of a specimen is performed such that a plurality of peaks arise in focus evaluation values Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An observation device, comprising:
    an image sensor that images a specimen and outputs an image signal,
    an AF detection circuit that calculates a focus evaluation value showing a larger value as degree of focus increases, based on the image signal, and
    a focus control circuit that changes focus position of the image sensor and controls focus position based on the focus evaluation value,
    wherein
    the AF detection circuit calculates a plurality of evaluation values based on signals relating to a plurality of frequency bands of the image signal, and
    the focus control circuit controls focus position based on maximum value or minimum value of the plurality of evaluation values corresponding to change in the focus position.

2. The observation device of claim 1, wherein:
    the focus control circuit controls focus position by selecting focus position corresponding to a maximum value or minimum value of the plurality of evaluation values.

3. The observation device of claim 2, wherein:
    when respective minimum values are detected in the plurality of evaluation values, the focus control circuit selects a focus position based on rate of change of the evaluation values corresponding to respective minimum values.

4. The observation device of claim 3, wherein:
    rate of change of the evaluation values is a reduction rate from a peak to a minimum value of a plurality of evaluation values, or increase rate from a minimum value to a peak.

5. The observation device of claim 3, wherein:
    rate of change of the evaluation values is an absolute value of inclination from a peak to a minimum value of the plurality of evaluation values, or inclination from a minimum value to a peak.

6. The observation device of claim 3, wherein:
    the focus control circuit selects a focus position corresponding to a minimum value having the largest rate of change of the evaluation values corresponding to respective minimum values of the plurality of evaluation values.

7. The observation device of claim 1, wherein:
    in a case where, among the plurality of evaluation values, there is not a minimum value of evaluation value relating to a higher frequency than the low frequency, within a given range from a focus position corresponding to minimum value of evaluation value relating to a low frequency, the focus control circuit selects a focus position corresponding to a minimum value of evaluation value relating to the low frequency.

8. A focus adjustment method for an observation device that has an image sensor that forms images of a specimen, comprising:
    changing focus position of the image sensor, and calculating a focus evaluation value showing a larger value as degree of focus increases, based on an image signal output by the image sensor,
    when calculating the focus evaluation value, calculating a plurality of evaluation values based on signals relating to a plurality of frequency bands of the image signal, and
    controlling focus position based on maximum value or minimum value of the plurality of evaluation values corresponding to change in the focus position.

9. The focus adjustment method of claim 8, further comprising:
    controlling focus position by selecting focus position corresponding to a maximum value or minimum value of the plurality of evaluation values.

10. The focus adjustment method of claim 9, further comprising:
    when retrospective minimum values are detected in the plurality of evaluation values, selecting a focus position based on rate of change of the evaluation values corresponding to respective minimum values.

11. The focus adjustment method of claim 10, wherein:
    rate of change of the evaluation values is a reduction rate from a peak to a minimum value of a plurality of evaluation values, or increase rate from a minimum value to a peak.

12. The focus adjustment method of claim 10, wherein:
    rate of change of the evaluation values is an absolute value of inclination from a peak to a minimum value of the plurality of evaluation values, or inclination from a minimum value to a peak.

13. The focus adjustment method of claim 10, further comprising:
    selecting a focus position corresponding to a minimum value having the largest rate of change of the evaluation values corresponding to respective minimum values of the plurality of evaluation values.

14. The focus adjustment method of claim 8, further comprising:
    in a case where, among the plurality of evaluation values, there is not a minimum value of evaluation value relating to a higher frequency than the low frequency, within a given range from a focus position corresponding to minimum value of evaluation value relating to a low frequency, selecting a focus position corresponding to a minimum value of evaluation value relating to the low frequency.

15. A non-transitory computer-readable medium storing a processor executable code, which when executed by at least one processor which is included within an observation device that has an image sensor for forming an image of a specimen, performs a focus adjustment method, the focus adjustment method comprising:
    changing focus position of the image sensor, and calculating a focus evaluation value exhibiting a larger value as degree of focus increases, based on an image signal output by the image sensor,
    when calculating the focus evaluation value, calculating a plurality of evaluation values based on signals relating to a plurality of frequency bands of the image signal, and
    controlling focus position based on maximum value or minimum value of the plurality of evaluation values corresponding to change in the focus position.

16. The non-transitory computer-readable medium of claim 15, wherein the focus adjustment method further comprises:
    controlling focus position by selecting focus position corresponding to a maximum value or minimum value of the plurality of evaluation values.

17. The non-transitory computer-readable medium of claim 16, wherein the focus adjustment method further comprises:
when retrospective minimum values are detected in the plurality of evaluation values, selecting a focus position based on rate of change of the evaluation values corresponding to respective minimum values.

18. The non-transitory computer-readable medium of claim 17, wherein the focus adjustment method further comprises:
rate of change of the evaluation values is a reduction rate from a peak to a minimum value of a plurality of evaluation values, or increase rate from a minimum value to a peak.

19. The non-transitory computer-readable medium of claim 17, wherein the focus adjustment method further comprises:
rate of change of the evaluation values is an absolute value of inclination from a peak to a minimum value of the plurality of evaluation values, or inclination from a minimum value to a peak.

20. The non-transitory computer-readable medium of claim 17, wherein the focus adjustment method further comprising
selecting a focus position corresponding to a minimum value having the largest rate of change of the evaluation values corresponding to respective minimum values of the plurality of evaluation values.

* * * * *